United States Patent [19]

Rivera

[11] Patent Number: 5,671,829

[45] Date of Patent: Sep. 30, 1997

[54] BRAKE SYSTEM FOR ELEVATOR CAR DOORS

[75] Inventor: James A. Rivera, Bristol, Conn.

[73] Assignee: Otis Elevator Company, Farmington, Conn.

[21] Appl. No.: 746,279

[22] Filed: Nov. 7, 1996

[51] Int. Cl.⁶ .............................. F16D 63/00; F16D 51/00; B60T 13/04
[52] U.S. Cl. .................. 188/171; 188/68; 188/74; 187/314
[58] Field of Search ................... 16/102; 187/313, 187/314, 350, 373, 324; 188/68, 72.3, 74, 158, 163, 166, 171, 189, 156

[56] References Cited

U.S. PATENT DOCUMENTS

| | | | |
|---|---|---|---|
| 3,344,556 | 10/1967 | Edwards | 187/314 |
| 3,439,454 | 4/1969 | Strettar | 187/314 |
| 3,874,632 | 4/1975 | Rago | 188/189 |
| 4,529,065 | 7/1985 | Kraft | 187/314 |
| 4,696,375 | 9/1987 | Mathews et al. | 187/313 |
| 4,926,974 | 5/1990 | Morris et al. | 187/314 |
| 5,492,266 | 2/1996 | Korhnen | 187/350 |
| 5,565,668 | 10/1996 | Karner | 187/373 |

*Primary Examiner*—Robert J. Oberleitner
*Assistant Examiner*—Chris Schwartz

[57] ABSTRACT

A brake mechanism for slowing elevator car doors in an elevator system during an emergency power outage or electrical control malfunction includes a brake shoe activated by a solenoid. During normal operation of the elevator car doors, the solenoid is in activated mode and maintains the brake shoe spaced away from the door pulley. During a power outage or electrical controls malfunction, the solenoid is deactivated and, in cooperation with a compression spring, forces the shoe brake to engage the door pulley to slow down the movement of elevator car doors.

3 Claims, 2 Drawing Sheets

BRAKE SYSTEM FOR ELEVATOR CAR DOORS

CROSS-REFERENCE TO RELATED APPLICATIONS

This application is related to commonly owned co-pending applications filed on the same day herewith having Ser. Nos: 08/746277 (OT-2661) and 08/746281 (OT-2680).

TECHNICAL FIELD

The present invention relates to elevator systems and, more particularly, to a brake system for elevator car doors.

BACKGROUND OF THE INVENTION

In conventional elevator systems, elevator car doors are selectively opened and closed by a reversible electric motor driving a mechanical assembly which typically includes many moving parts such as gear boxes, sets of drive arms, and links. Such mechanical drive systems typically produce sufficient amounts of drag and friction to decelerate the elevator car doors and do not require a braking mechanism when the motor controls malfunction or when the power is cut.

A door operating system driven by a linear induction motor significantly simplifies the kinematics of the open and close door functions. With minimal moving parts, the linear motor controls the thrust to the doors, allowing proper operation thereof. The system's moving mass and drag or friction are calibrated and are overcome during normal performance. However, if power were to shut off or controls were to malfunction, the system would coast to a stop position. Coasting is not desirable because of the potential for contact between the doors and a passenger crossing the threshold.

For proper elevator car door operation during power shut off or malfunction, the doors must overcome the inertia of the door movement to close slowly. However, it is not desirable to have doors come to an instant stop because the shock may cause damage to the linear motor drive system. An additional consideration is that elevator regulations require that passengers be able to open the elevator car doors by hand from inside the elevator car with minimal force, not to exceed a certain limit. Therefore, elevator car doors opened and closed by linear motors require mechanisms to allow proper operation of the doors during emergency situations.

DISCLOSURE OF THE INVENTION

It is an object of the present invention to provide an emergency brake mechanism for elevator car doors driven by a linear motor system.

It is another object of the present invention to provide an emergency brake mechanism for elevator car doors, which, after deployment, allows passengers of the elevator car to force the elevator car doors open when a minimum force, required by the elevator code, is applied.

According to the present invention a brake system for elevator car doors operated by a linear induction motor includes a brake shoe activated by a solenoid with the brake shoe generating friction on a door pulley to slow the moving mass of the elevator car doors during emergency conditions such as power outages or electrical control malfunctions. The solenoid in the activated powered up mode maintains the brake shoe spaced away from the door pulley allowing proper operation of the elevator car doors. In the deactivated mode, when the power outage or malfunction of the control system occurs, the solenoid releases a plunger supporting the brake shoe. A compression spring, disposed around the plunger between the brake shoe and the solenoid, forces the brake shoe to engage the pulley, thereby slowing the elevator car doors down.

One advantage of the present invention is that even after the brake mechanism is deployed, passengers of the elevator car can force the doors open. Another advantage of the present invention is that in a two door center opening bi-parting configuration only a single brake mechanism is required to slow both doors. A further advantage of the present invention is that both doors are slowed down at substantially the same rate.

The foregoing and other advantages of the present invention become more apparent in light of the following detailed description of the exemplary embodiments thereof, as illustrated in the accompanying drawings.

BEST MODE FOR CARRYING OUT THE INVENTION

Figure 1:
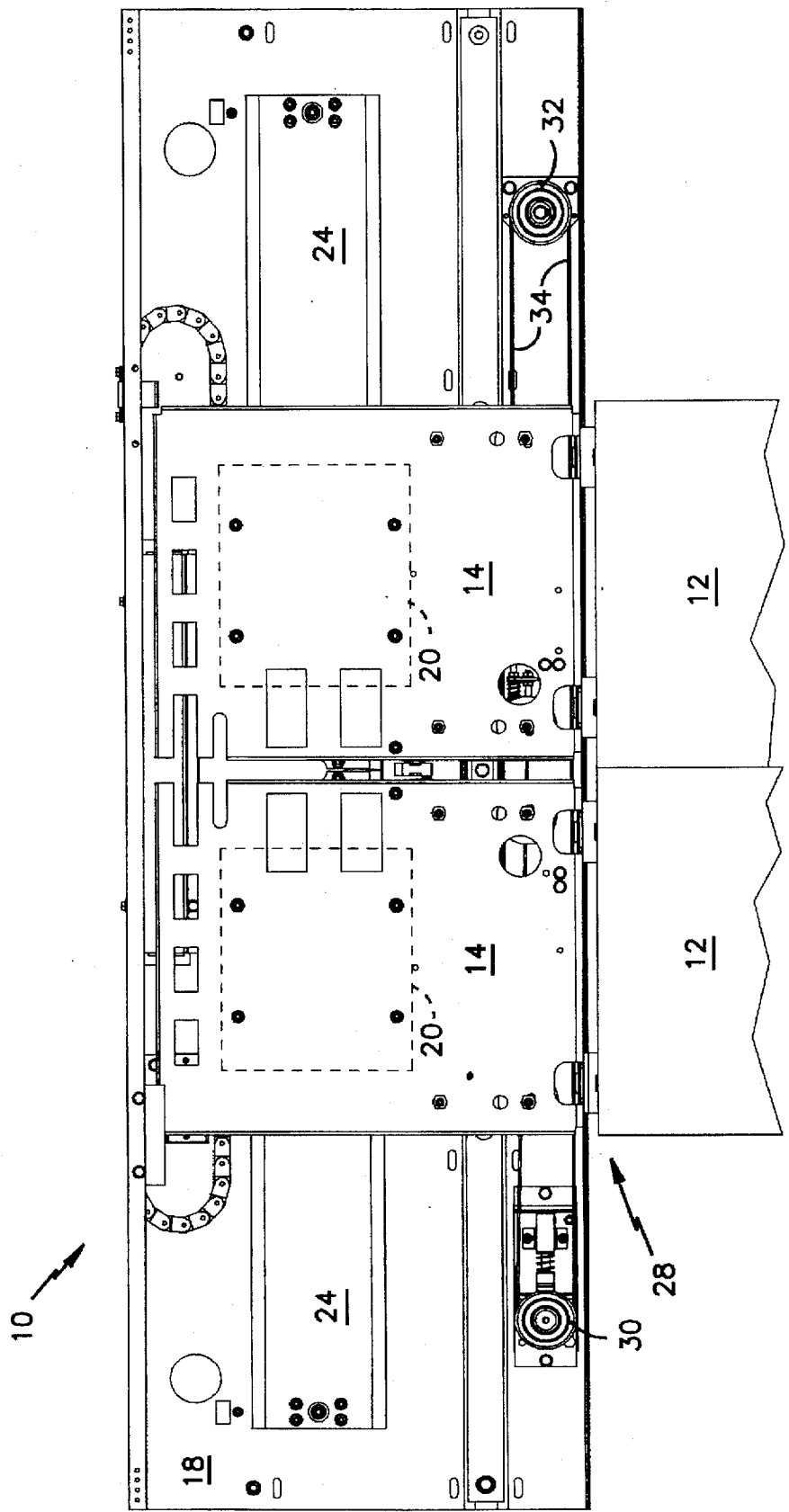
FIG. 1 is a schematic, front view of an elevator car door operating system having an emergency brake mechanism, according to the present invention.

Referring to FIG. 1, a door system 10 for opening and closing a pair of doors 12 of an elevator car (not shown) includes a pair of door hangers 14 for suspending the elevator car doors 12 therefrom and a linear motor for driving the elevator car doors 12. The door hangers 14 are movably attached onto a header bracket 18 which is secured onto the elevator car. The linear motor includes a pair of motor primaries 20 (shown in phantom) attached onto the door hangers 14 and a motor secondary 24 attached onto the header bracket 18 of the elevator car.

Figure 2:
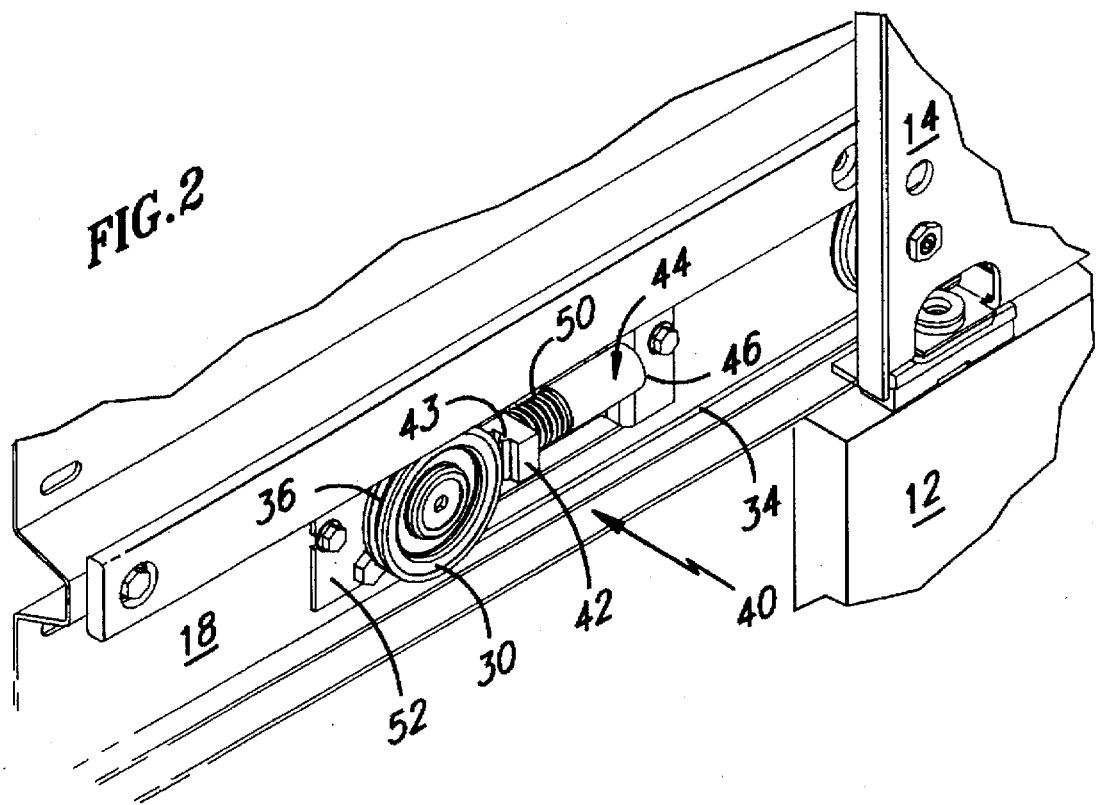
FIG. 2 is an enlarged, schematic, perspective view of the brake mechanism of FIG. 1.
Figure 3:
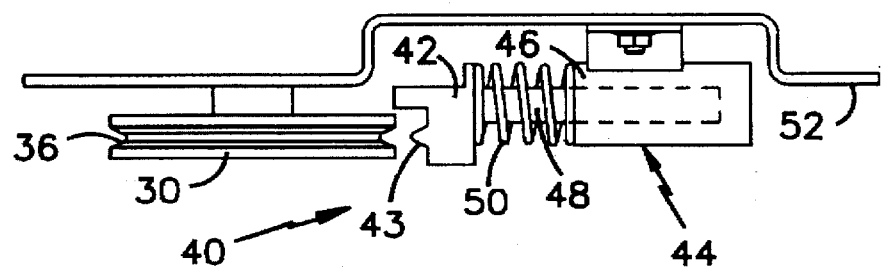
FIG. 3 is an enlarged, schematic, top view of the brake mechanism of FIG. 2.

The movement of the elevator car doors 12 is timed by a synchronization system 28 which includes a first pulley 30 and a second pulley 32 with a cable 34 extending over both pulleys and attaching onto the door hangers 14. Each pulley 30, 32 includes a pulley liner 36 having a liner contour, as best seen in FIGS. 2 and 3. The cable 34 fits into the pulley liner 36 and makes contact with the outer circumference thereof.

Referring to FIGS. 2 and 3, a brake system 40 is adjacent to the first pulley 30 and includes a brake shoe 42 attached to a solenoid 44. The brake shoe 42 includes a contoured surface 43 shaped to mate with the contoured pulley liner 36. The solenoid 44 includes a solenoid coil frame 46 and a plunger 48 having one end inserted into the solenoid coil frame 46 and having another end fixedly attached to the brake shoe 42. A spring 50 is fitted over the plunger 48 with one end of the spring 50 pressing against the brake shoe 42 and the other end of the spring 50 pressing against the solenoid coil frame 46. The solenoid 44 is fixedly attached onto a mounting bracket 52, which is secured to the header bracket 18 of the elevator car.

In operation, when the elevator car door system 10 is powered and is in proper operation, the solenoid 44 is activated. In the activated powered-up mode, the solenoid 44 is energized and retains the plunger 48 inside the solenoid coil frame 46. In the energized mode the contoured surface 43 of the brake shoe 42 and the pulley liner 36 of the door pulley 30 have a small clearance therebetween of approximately 3 millimeters (3 mm). The spring 50 is compressed between the brake shoe 42 and the solenoid coil frame 46.

When either a power outage occurs or the door operating control system malfunctions, the solenoid 44 becomes deactivated. In the deactivated mode, the solenoid coil frame 46 releases the plunger 48. As the plunger 48 is released, the spring 50 expands and forces the brake shoe 42 forward against the pulley liner 36. The brake shoe contoured surface 43 engages the contoured pulley liner 36 and slows down the rotation of the pulley 30. Once the rotation of the pulley is slowed down, the cable 34 also is slowed down, subsequently, slowing the movement of the elevator car doors 12. Thus, the present invention provides an emergency stopping mechanism for elevator car doors driven by a linear induction motor. Unlike conventional gear box driven elevator car doors, elevator car doors driven by linear induction motors need a braking mechanism, since the linear induction motor is essentially frictionless.

The spring 50 is chosen to allow for the elevator car doors 12 to be manually opened from inside. An elevator code requires a minimum load of two hundred Newtons (200N) to open the elevator car doors 12 from the inside of the elevator car. Therefore, the spring 50 is chosen so that the spring can be overcome when the minimum load is applied. The solenoid 44 is of a conventional type. The solenoid used in the best mode embodiment of the present invention is manufactured by Trombetta Electromagnetics of Milwaukee, Wis. The brake shoe 42 is fabricated from aluminum to maximize friction between the brake shoe and the pulley liner. Other materials having high friction coefficients, such as bronze, would be suitable also.

One advantage of the present invention is that the brake system complies with the elevator code and allows the doors to be opened when a sufficient amount of force is applied, even after the brake shoe is deployed and engaged with the pulley. Another advantage of the present invention is that with a single brake mechanism both doors can be slowed down substantially simultaneously. Use of a single braking system represents a cost saving. A further advantage of the present advantage is that both doors are slowed down at substantially the same rate.

While the present invention has been illustrated and described with respect to a particular embodiment thereof, it should be appreciated by those of ordinary skill in the art, that various modifications to this invention may be made without departing from the spirit and scope of the present invention. For example, the present invention can be used with various elevator car door configurations and with other motor configurations.

I claim:

1. A brake mechanism for elevator car doors driven by a linear motor, movement of said elevator car doors being synchronized by a cable extending over a first pulley and a second pulley, said first pulley having a contoured liner, said brake mechanism comprising:

a solenoid having a solenoid coil frame and a plunger, said plunger having a first end and a second end, said solenoid having an activated mode and a deactivated mode, in said activated mode said first end of said plunger being retained within said solenoid coil frame, in said deactivated mode said solenoid coil frame releasing said plunger;

a brake shoe having a contoured surface, said contoured surface adapted to mate with said contoured liner of said first pulley, said brake shoe attaching onto said second end of said solenoid plunger; and a compression spring positioned between said brake shoe and said solenoid coil frame, said compression spring being compressed during said activated mode of said solenoid, said compression spring forcing said contoured surface of said brake shoe to engage said contoured liner of said first pulley after said solenoid becomes deactivated to slow movement of said elevator car doors.

2. The brake mechanism according to claim 1 wherein said shoe brake is fabricated from aluminum.

3. A synchronization system for timing movement of elevator car doors in an elevator system, said elevator car doors being suspended from a first and a second door hangers, said door hangers being movably supported by a header bracket, said synchronization system comprising:

a first pulley attaching onto one side of said header bracket;

a second pulley attaching onto an opposite side of said header bracket;

a relating cable extending over said first pulley and said second pulley to synchronize movement of said elevator car doors; and a brake mechanism having an activated mode and a deactivated mode, in said deactivated mode said brake mechanism engaging said first pulley to provide emergency stopping for said elevator car doors.

* * * * *